(12) United States Patent
Poole et al.

(10) Patent No.: US 7,094,287 B2
(45) Date of Patent: *Aug. 22, 2006

(54) LIQUID COMPOSITION ADDITIVE TO REDUCE CURING TIME OF SURFACE COATINGS

(75) Inventors: Rick Poole, San Antonio, TX (US); Mark Lane, San Antonio, TX (US)

(73) Assignee: SGA Global, L.L.C., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/111,134

(22) Filed: Apr. 21, 2005

(65) Prior Publication Data

US 2005/0235880 A1    Oct. 27, 2005

Related U.S. Application Data

(63) Continuation-in-part of application No. 10/829,759, filed on Apr. 22, 2004.

(51) Int. Cl.
*C04B 14/00* (2006.01)
(52) U.S. Cl. ...................... 106/705; 106/712
(58) Field of Classification Search ................ 106/712, 106/705
See application file for complete search history.

(56) References Cited

U.S. PATENT DOCUMENTS

| | | | | |
|---|---|---|---|---|
| 3,876,411 A | * | 4/1975 | Fowler | 71/11 |
| 3,948,830 A | * | 4/1976 | Donnelly et al. | 523/401 |
| 5,399,048 A | * | 3/1995 | Walker, Jr. | 405/129.9 |
| 6,264,740 B1 | * | 7/2001 | McNulty, Jr. | 106/817 |
| 6,652,643 B1 | * | 11/2003 | Black | 106/659 |
| 2002/0150429 A1 | * | 10/2002 | Hull | 405/129.2 |
| 2003/0041782 A1 | * | 3/2003 | Malloy et al. | 106/705 |
| 2005/0009710 A1 | * | 1/2005 | Heathman et al. | 507/203 |

* cited by examiner

*Primary Examiner*—Helene Klemanski
(74) *Attorney, Agent, or Firm*—Jackson Walker L.L.P.; William B. Nash; Thomas E. Sisson

(57) ABSTRACT

A liquid composition, active curing additive for water or solvent borne surface coatings and sealants such: latex products, paints, putties, caulks, sports track and court construction, asphalt or coal tar seal coating, asphalt paving, micro-seal, roof tars, asphalt emulsions, crack sealants, and the like is provided. The additive functions to significantly reduce the amount of time required for the surface coating to cure and thereby allows the coated or sealed surface to be quickly returned to service. Preferably, the additive is composed of a composition of fly ash, hydrous ammonia, water or solvent, and bentonite. This formulation, when added to a liquid surface sealant or coating, will create an active process within the film of the said sealant or coating which draws water out of the film extremely fast, thereby reducing the amount of time required for the surface coating or sealant to cure.

1 Claim, No Drawings

LIQUID COMPOSITION ADDITIVE TO REDUCE CURING TIME OF SURFACE COATINGS

This patent application is a continuation-in-part of and claims priority from pending application Ser. No. 10/829,759 filed on Apr.22, 2004 . This patent application incorporates by reference application Ser. No. 10/829,759 as if it were fully printed herein.

BACKGROUND OF THE INVENTION

The present invention relates to an active curing additive for water or solvent borne surface sealants or coatings. More particularly, the present invention relates to an active curing additive for water or solvent surface sealants and coatings such as latex products, paints, putties, caulks, sports track and court construction, asphalt or coal tar seal coating, asphalt paving, micro-seal, roof tars, asphalt emulsions, crack sealants, and the like. In some situations, the drying or cure time for a particular coating is critical. For example, asphalt parking lots must be coated to retard oxidation and protect the surface from harmful automotive fluids. However, closing a lot creates considerable problems for the business customers and owners. Customers who must park at a distance from the business are inconvenienced and this adversely affects sales.

Currently, the minimum industry cure time for a parking lot seal coating is 24 to 48 hours. Further, a location may be subsequently closed to apply painted stripes to the coated surface. This causes additional customer inconvenience.

The present inventive active curing additive, when added to such a surface sealant or paint, allows traffic to be reintroduced to a parking lot within 2 to 4 hours of the final application coat. The faster cure time of the present invention allows for striping to be applied within an hour or two of the final coat thereby eliminating not only a second customer inconvenience, but eliminating a second trip by the application contractor to the job site. As may be easily seen, the reduced cure and drying times of the present invention allows the contractor to complete more jobs per unit of time, generate greater revenues with fewer labor costs, and provide greater customer satisfaction.

The present invention provides a longer lasting coating film which does not bleed into or smudge onto the painted stripes. Additionally, the present invention may be used with traffic paint for stripes. The same advantages noted in the use of the present invention as a parking lot sealant result when used as a stripe or traffic paint, i.e., quicker cure and drying times in humid conditions resulting in greater profits and added convenience to the public.

Furthermore, the inventive active curing additive reduces curing time in other water or solvent sealants and coatings such as latex products, paints, putties, caulks, sports track and court construction, asphalt or coal tar seal coating, asphalt paving, micro-seal, roof tars, asphalt emulsions, crack sealants, and the like which all require an extended cure time. This cure time can be shortened by the active curing process triggered by the inventive active curing additive resulting in reduced down time for the customer and more productivity for the contractor.

SUMMARY OF THE INVENTION

An active curing additive which reduces cure time is provided by a mixture of water or solvent borne surface sealants or coatings; a pozzolanic powder such as fly ash, gypsum, Portland cement, lime or calcium carbonates; an ammonium dispersing composition, such as hydrous ammonia, ammonium chloride; ammonium sulfate; and bentonite. Water or solvent is utilized to assist in mixing the separate components. Various colorants or pigments may be further added to provide the appropriate coloration for the sealant or paint.

DESCRIPTION OF THE PREFERRED EMBODIMENT

The present inventive active curing additive may be packaged in 2, 30, 50, 250, and 4000 gallon containers for ultimate addition of an amount equal to 2% to 6% mix ratio to the coating or sealant to be employed. Such coating or sealant may be selected from a number of water or solvent borne surface sealants or coatings such as: latex products, paints, putties, caulks, sports track and court construction, asphalt or coal tar seal coating, asphalt paving, micro-seal, roof tars, asphalt emulsions, crack sealants, and the like.

The active curing additive is formulated by mixing 0.5 to 7.0 pounds of a pozzonlanic powder such as fly ash with one to two gallons of water or solvent and 0.5 to 5.0 ounces of an ammonium additive such as hydrous ammonia. Solvents which may be used in the mixture include toluene, mineral spirits, xylene, or similar petroleum-based solvents. Colorant or pigment may be added to color the additive in a variable amount to achieve the desired shade or tone needed. Bentonite in the amount of 0.25 to 5.0 ounces is added to achieve a gel form suspending the entire mix so that the final product remains one consistent texture and pourable.

These components may be mixed prior to arrival at the job site or mixed at the job site for application to the applicable coating or sealant. The fly ash may be replaced with Portland cement, gypsum, lime, or other pozzonlanic cementitious composition. The quantity of the pozzonlanic material may vary depending upon the drying or cure time desired.

The preferred range for fly ash is 0.5 to 7.0 pounds, most preferably 3.0 pounds, in approximately two gallons of water with one half once of ammonium additive and two ounces of bentonite. The cure time required after application, under standard favorable conditions, until coating or sealant may be returned to service is reduced from approximately 24 hours to approximately 2.5 hours; an approximate 10-fold reduction.

As noted, coloring pigment may be added to the composition. For example, black powder pigment (such as carbon black) may be added to the composition to provide a black sealant for use on asphalt surfaces. Also, liquid black pigment may also be added to the composition to provide a black sealant. Iron oxide may be added to give the sealant a red coloring. Titanium dioxide may be used as a white coloring agent. Other colorants may be added as desired.

When the present inventive additive is mixed with a standard striping paint or other latex products, the amount of ammonium additive maybe decreased and even eliminated if the particular paint or latex product has an ammonium component.

While this invention has been described as having a preferred design and use, it is understood that it is capable of further modifications, uses and/or adaptations following in general the principle of the invention and including such departures from the present disclosure as come within the known or customary practice in the art to which the invention pertains and as maybe applied to the central features hereinbefore set forth, and fall within the scope of the invention and the limits of the appended claims. In particular, although the composition is described as composed of certain quantities of the stated ingredients, it should be understood that a vast range of quantity is permissible and will still yield the desired results.

The invention claimed is:

1. An active curing additive for reducing the curing time of surface coatings and sealants comprising:
   a mixture of a pozzolanic powder, an ammonium addictive, and bentonite,
   wherein said ammonium additive is selected from the group consisting of hydrous ammonia, ammonia sulfate, and ammonia chloride, and
   wherein said pozzolanic powder is selected from the group consisting of fly ash, gypsum, Portland cement, and calcium carbonate; and solvent.

* * * * *